g
UNITED STATES PATENT OFFICE.

MANUEL VILLEGAS, OF MEXICO, MEXICO.

ARTICLE OF FOOD AND PROCESS OF MAKING THE SAME.

1,018,595. Specification of Letters Patent. Patented Feb. 27, 1912.

No Drawing. Application filed August 21, 1911. Serial No. 645,119.

*To all whom it may concern:*

Be it known that I, MANUEL VILLEGAS, a citizen of the United Mexican States, residing at Mexico city, Federal District, Mexico, have invented certain new and useful Improvements in Articles of Food and Processes of Making the Same, of which the following is a specification.

My invention relates to an article of food and the process of making the same, by which is obtained either a flour of maize, a flour for making bread, or a dough as used is Latin-American countries for making "tortillas" or pan-cakes of different thickness.

Though the products of my invention have several applications, in each and everyone is used triturated and sifted cobs and stems of maize plants, which being added to a cereal such as maize, wheat, rye, etc., is ground so that the three components be thoroughly intermingled by the grinding.

My composition for obtaining maize-flour consists of the following, in the proportion stated, viz:—

| | |
|---|---|
| Maize | 100 kilos. |
| Dried cobs of maize | 15 to 25 kilos. |
| Dried stems (reeds) of maize | 25 kilos. | that is, about 5 parts by weight of grains of maize, 1 part by weight of cobs of maize and 1 part by weight of stems of maize.

The quantities of cobs and stems may be slightly changed; the first mentioned should be a selected, large and white cob and all putrefied and spotted parts must be separated, and the second as well should be clean and free from any rind.

The cobs and stems of maize are put together and triturated, then sifted so as to remove the fibrous and wooden particles, and the resulting product is added to the grains or kernels of maize, and the whole is then ground in a stone mill, whereby the particles of the three substances will incorporate. The new product is now sifted, and classified in superfine flour, second and bran.

Instead of the maize, any other cereal as for instance wheat may be ground together with the cobs and stems of maize, and a flour for making bread is thus obtained.

The proportions, as indicated in the above referred example of maize, should preferably be maintained both in regard to the grain of whatever specie it may be, and to the cobs and stems.

A dough of maize for making pan-cakes, which as stated are generally called "tortillas" in Latin-America, is composed of maize with but 15% of cobs and 15% of stems, the two aggregates being prepared as explained in the first example, and then added to the grains of maize. These three substances are treated by boiling, for from 15 to 20 minutes under a pressure of from 40 to 50 pounds. The water used for the boiling should preferably be purified by electrolysis, and the quantity of lime should be about 1 kilo lime to 200 liters water or a solution of ½%, which is slightly less than that which is customarily required for preparing maize, before grinding it to the mass or dough possessing the proper qualities necessary for kneading, forming and baking pan-cakes *i. e.* "tortillas." After the boiling, the triturated cobs, stems and maize should remain in the lime water for about 6 to 8 hours, then washed in potable water, and henceforth rest for about 2 hours in fresh water, after which the compound may be ground as usual.

Incidentally may be remarked that the residuum of the grains and of the cobs and stems may be conveniently employed as an excellent fodder, when mingled with the dough remaining after the daily sales, which dough, for such purpose and before the fermentation has destroyed it, is dried by hot air and then pulverized.

Having thus described my invention what I claim is:

1. As a new composition of matter a food compound consisting of a ground or comminuted mixture of about 5 parts by weight of grains of maize, 1 part by weight of cobs of maize and 1 part by weight of stalks of maize.

2. In the process of producing a food compound the steps comprising triturating and sifting the cobs and stalks of maize, adding grains of maize and grinding the product.

3. The herein-described process of producing a food compound consisting in triturating and sifting the cobs and stalks of maize, adding grains of maize, boiling the product for about 20 minutes in lime water under pressure, permitting the product to remain in the lime water for about six hours, washing the product in fresh water and finally grinding the product.

In testimony whereof I have affixed my signature in presence of two witnesses.

MANUEL VILLEGAS.

Witnesses:
M. V. SANDERS,
K. GRANDJEAN.